United States Patent
Forrest

(10) Patent No.: US 11,846,232 B2
(45) Date of Patent: Dec. 19, 2023

(54) LOW-GRADE HEAT OPTIMIZATION OF RECUPERATIVE SUPERCRITICAL $CO_2$ POWER CYCLES

(71) Applicant: 8 Rivers Capital, LLC, Durham, NC (US)

(72) Inventor: Brock Alan Forrest, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 2 days.

(21) Appl. No.: 17/412,934

(22) Filed: Aug. 26, 2021

(65) Prior Publication Data

US 2021/0388764 A1 Dec. 16, 2021

Related U.S. Application Data

(63) Continuation of application No. 16/113,076, filed on Aug. 27, 2018, now Pat. No. 11,125,159.

(Continued)

(51) Int. Cl.
| | |
|---|---|
| *F02C 7/10* | (2006.01) |
| *F02C 3/30* | (2006.01) |
| *F02C 3/34* | (2006.01) |
| *F01D 25/32* | (2006.01) |
| *F02C 1/08* | (2006.01) |
| *F02C 1/00* | (2006.01) |

(52) U.S. Cl.
CPC ............. *F02C 7/10* (2013.01); *F01D 25/32* (2013.01); *F02C 1/007* (2013.01); *F02C 1/08* (2013.01); *F02C 3/30* (2013.01); *F02C 3/34* (2013.01); *F05D 2270/082* (2013.01)

(58) Field of Classification Search
CPC .... F02C 7/10; F02C 1/007; F02C 1/08; F02C 3/30; F02C 3/34; F02C 1/10; F01D 25/32
See application file for complete search history.

(56) References Cited

U.S. PATENT DOCUMENTS

| | | |
|---|---|---|
| 3,369,361 A | 2/1968 | Craig |
| 3,376,706 A | 4/1968 | Angelino |
| (Continued) | | |

FOREIGN PATENT DOCUMENTS

| | | |
|---|---|---|
| JP | 2225905 | 9/1990 |
| JP | H08189457 | 7/1996 |
| (Continued) | | |

OTHER PUBLICATIONS

Combs, Jr. "An Investigation of the Supercritical CO2 Cycle (Feher Cycle) for Shipboard Application," 1977, Submitted in Partial Fulfillment of the Requirements for the Degree of Ocean Engineer and the Degree of Master of Science in Mechanical Engineering at the Massachusetts Institute of Technology, 148 pages.

(Continued)

*Primary Examiner* — Katheryn A Malatek
(74) *Attorney, Agent, or Firm* — Womble Bond Dickinson (US) LLP

(57) ABSTRACT

The present disclosure provides systems and methods for power production. In particular, the systems and methods utilize the addition of heat to an expanded turbine exhaust stream in order to increase the available quantity of heat for recuperation and use therein for heating a compressed carbon dioxide stream for recycle back to a combustor of the power production system and method.

13 Claims, 4 Drawing Sheets

Related U.S. Application Data

(60) Provisional application No. 62/551,025, filed on Aug. 28, 2017.

(56) References Cited

U.S. PATENT DOCUMENTS

| | | |
|---|---|---|
| 3,503,208 A | 3/1970 | Schmidt |
| 3,544,291 A | 12/1970 | Schlinger et al. |
| 3,736,745 A | 6/1973 | Karig |
| 3,837,788 A | 9/1974 | Craig et al. |
| 3,868,817 A | 3/1975 | Marion et al. |
| 3,971,211 A | 7/1976 | Wethe et al. |
| 3,976,443 A | 8/1976 | Paull et al. |
| 4,132,065 A | 1/1979 | McGann |
| 4,154,581 A | 5/1979 | Nack et al. |
| 4,191,500 A | 3/1980 | Oberg et al. |
| 4,193,259 A | 3/1980 | Muenger et al. |
| 4,206,610 A | 6/1980 | Santhanam |
| 4,461,154 A | 7/1984 | Allam |
| 4,498,289 A | 2/1985 | Osgerby |
| 4,522,628 A | 6/1985 | Savins |
| 4,602,483 A | 7/1986 | Wilks et al. |
| 4,702,747 A | 10/1987 | Meyer et al. |
| 4,721,420 A | 1/1988 | Santhanam et al. |
| 4,765,143 A | 8/1988 | Crawford et al. |
| 4,765,781 A | 8/1988 | Wilks et al. |
| 4,839,030 A | 6/1989 | Comolli et al. |
| 4,852,996 A | 8/1989 | Knop et al. |
| 4,881,366 A | 11/1989 | Nurse |
| 4,957,515 A | 9/1990 | Hegarty |
| 4,999,992 A | 3/1991 | Nurse |
| 4,999,995 A | 3/1991 | Nurse |
| 5,175,995 A | 1/1993 | Pak et al. |
| 5,247,791 A | 9/1993 | Pak et al. |
| 5,265,410 A | 11/1993 | Hisatome |
| 5,345,756 A | 9/1994 | Jahnke et al. |
| 5,353,721 A | 10/1994 | Mansour et al. |
| 5,394,686 A | 3/1995 | Child et al. |
| 5,415,673 A | 5/1995 | Hilton et al. |
| 5,417,052 A | 5/1995 | Bharathan et al. |
| 5,421,166 A | 6/1995 | Allam et al. |
| 5,507,141 A | 4/1996 | Stigsson |
| 5,520,894 A | 5/1996 | Heesink et al. |
| 5,590,519 A | 1/1997 | Almlöf et al. |
| 5,595,059 A | 1/1997 | Huber et al. |
| 5,692,890 A | 12/1997 | Graville |
| 5,709,077 A | 1/1998 | Beichel |
| 5,715,673 A | 2/1998 | Beichel |
| 5,724,805 A | 3/1998 | Golomb et al. |
| 5,802,840 A | 9/1998 | Wolf |
| 5,906,806 A | 5/1999 | Clark |
| 5,937,652 A | 8/1999 | Abdelmalek |
| 6,024,029 A | 2/2000 | Clark |
| 6,117,916 A | 9/2000 | Allam et al. |
| 6,148,602 A | 11/2000 | Demetri |
| 6,170,264 B1 | 1/2001 | Viteri et al. |
| 6,196,000 B1 | 3/2001 | Fassbender |
| 6,199,364 B1 | 3/2001 | Kendall et al. |
| 6,202,574 B1 | 3/2001 | Liljedahl et al. |
| 6,209,307 B1 | 4/2001 | Hartman |
| 6,260,348 B1 | 7/2001 | Sugishita et al. |
| 6,263,661 B1 | 7/2001 | Van der Burgt et al. |
| 6,269,624 B1 | 8/2001 | Frutschi et al. |
| 6,289,666 B1 | 9/2001 | Ginter |
| 6,298,664 B1 | 10/2001 | Åsen et al. |
| 6,333,015 B1 | 12/2001 | Lewis |
| 6,360,561 B2 | 3/2002 | Allam et al. |
| 6,389,814 B2 | 5/2002 | Viteri et al. |
| 6,430,916 B2 | 8/2002 | Sugishita et al. |
| 6,470,683 B1 | 10/2002 | Childs et al. |
| 6,532,745 B1 | 3/2003 | Nealy |
| 6,536,205 B2 | 3/2003 | Sugishita et al. |
| 6,543,214 B2 | 4/2003 | Sasaki et al. |
| 6,550,234 B2 | 4/2003 | Guillard |
| 6,598,398 B2 | 7/2003 | Viteri et al. |
| 6,612,113 B2 | 9/2003 | Guillard |
| 6,622,470 B2 | 9/2003 | Viteri et al. |
| 6,629,414 B2 | 10/2003 | Fischer |
| 6,637,183 B2 | 10/2003 | Viteri et al. |
| 6,684,643 B2 | 2/2004 | Frutschi |
| 6,764,530 B2 | 7/2004 | Iijima |
| 6,775,987 B2 | 8/2004 | Sprouse et al. |
| 6,802,178 B2 | 10/2004 | Sprouse et al. |
| 6,804,962 B1 | 10/2004 | Prueitt |
| 6,820,689 B2 | 11/2004 | Sarada |
| 6,824,710 B2 | 11/2004 | Viteri et al. |
| 6,871,502 B2 | 3/2005 | Marin et al. |
| 6,877,319 B2 | 4/2005 | Linder et al. |
| 6,877,322 B2 | 4/2005 | Fan |
| 6,898,936 B1 | 5/2005 | Ochs et al. |
| 6,910,335 B2 | 6/2005 | Viteri et al. |
| 6,918,253 B2 | 7/2005 | Fassbender |
| 6,945,029 B2 | 9/2005 | Viteri |
| 6,945,052 B2 | 9/2005 | Frutschi et al. |
| 6,993,912 B2 | 2/2006 | Fischer |
| 7,007,474 B1 | 3/2006 | Ochs et al. |
| 7,007,486 B2 | 3/2006 | Sprouse et al. |
| 7,021,063 B2 | 4/2006 | Viteri |
| 7,022,168 B2 | 4/2006 | Schimkat et al. |
| 7,043,920 B2 | 5/2006 | Viteri et al. |
| 7,074,033 B2 | 7/2006 | Neary |
| 7,089,743 B2 | 8/2006 | Frutschi et al. |
| 7,111,463 B2 | 9/2006 | Sprouse et al. |
| 7,124,589 B2 | 10/2006 | Neary |
| 7,147,461 B2 | 12/2006 | Neary |
| 7,191,587 B2 | 3/2007 | Marin et al. |
| 7,192,569 B2 | 3/2007 | Stewart |
| 7,281,590 B2 | 10/2007 | Van de Waal |
| 7,284,362 B2 | 10/2007 | Marin et al. |
| 7,299,637 B2 | 11/2007 | Becker |
| 7,303,597 B2 | 12/2007 | Sprouse et al. |
| 7,328,581 B2 | 2/2008 | Christensen et al. |
| 7,334,631 B2 | 2/2008 | Kato et al. |
| 7,360,639 B2 | 4/2008 | Sprouse et al. |
| 7,363,764 B2 | 4/2008 | Griffin et al. |
| 7,377,111 B2 | 5/2008 | Agnew |
| 7,387,197 B2 | 6/2008 | Sprouse et al. |
| 7,402,188 B2 | 7/2008 | Sprouse |
| 7,469,544 B2 | 12/2008 | Farhangi |
| 7,469,781 B2 | 12/2008 | Chataing et al. |
| 7,516,607 B2 | 4/2009 | Farhangi et al. |
| 7,516,609 B2 | 4/2009 | Agnew |
| 7,547,419 B2 | 6/2009 | Sprouse et al. |
| 7,547,423 B2 | 6/2009 | Sprouse et al. |
| 7,553,463 B2 | 6/2009 | Zauderer |
| 7,615,198 B2 | 11/2009 | Sprouse et al. |
| 7,665,291 B2 | 2/2010 | Anand et al. |
| 7,717,046 B2 | 5/2010 | Sprouse et al. |
| 7,722,690 B2 | 5/2010 | Shires et al. |
| 7,731,783 B2 | 6/2010 | Sprouse et al. |
| 7,739,874 B2 | 6/2010 | Nigro |
| 7,740,671 B2 | 6/2010 | Yows et al. |
| 7,740,672 B2 | 6/2010 | Sprouse |
| 7,814,975 B2 | 10/2010 | Hagen et al. |
| 7,826,054 B2 | 11/2010 | Zillmer et al. |
| 7,827,797 B2 | 11/2010 | Pronske et al. |
| 7,874,140 B2 | 1/2011 | Fan et al. |
| 7,882,692 B2 | 2/2011 | Pronske et al. |
| 7,927,574 B2 | 4/2011 | Stewart |
| 7,934,383 B2 | 5/2011 | Gutierrez et al. |
| 7,950,243 B2 | 5/2011 | Gurin |
| 8,043,588 B2 | 10/2011 | Hustad et al. |
| 8,088,196 B2 | 1/2012 | White et al. |
| 8,109,095 B2 | 2/2012 | Henriksen et al. |
| 8,220,248 B2 | 7/2012 | Wijmans et al. |
| 2002/0108371 A1 | 8/2002 | Rouse et al. |
| 2002/0134085 A1 | 9/2002 | Frutschi |
| 2003/0131582 A1 | 7/2003 | Anderson et al. |
| 2004/0011057 A1 | 1/2004 | Huber |
| 2004/0123601 A1 | 7/2004 | Fan |
| 2004/0134197 A1 | 7/2004 | Marin et al. |
| 2005/0126156 A1 | 6/2005 | Anderson et al. |
| 2006/0242907 A1 | 11/2006 | Sprouse et al. |
| 2007/0180768 A1 | 8/2007 | Briesch et al. |
| 2007/0274876 A1 | 11/2007 | Chiu et al. |

(56) References Cited

U.S. PATENT DOCUMENTS

| | | |
|---|---|---|
| 2008/0010967 A1 | 1/2008 | Griffin et al. |
| 2008/0104958 A1 | 5/2008 | Finkenrath et al. |
| 2008/0115500 A1 | 5/2008 | MacAdam et al. |
| 2008/0166672 A1 | 7/2008 | Schlote et al. |
| 2008/0187877 A1 | 8/2008 | Fitzsimmons et al. |
| 2008/0190214 A1 | 8/2008 | Ubowski et al. |
| 2008/0309087 A1 | 12/2008 | Evulet et al. |
| 2009/0025390 A1 | 1/2009 | Christensen et al. |
| 2009/0061264 A1 | 3/2009 | Agnew |
| 2009/0130660 A1 | 5/2009 | Faham et al. |
| 2009/0229271 A1 | 9/2009 | De Ruyck et al. |
| 2009/0260585 A1 | 10/2009 | Hack et al. |
| 2009/0301054 A1 | 12/2009 | Simpson et al. |
| 2010/0018218 A1 | 1/2010 | Riley et al. |
| 2010/0024378 A1 | 2/2010 | Ackermann et al. |
| 2010/0024381 A1 | 2/2010 | Ackermann et al. |
| 2010/0024421 A1 | 2/2010 | Litwin et al. |
| 2010/0024433 A1 | 2/2010 | Ackermann et al. |
| 2010/0031668 A1 | 2/2010 | Kepplinger |
| 2010/0077752 A1 | 4/2010 | Papile |
| 2011/0012773 A1 | 1/2011 | Cunning et al. |
| 2011/0036011 A1 | 2/2011 | Sprouse et al. |
| 2011/0127733 A1 | 6/2011 | Freund et al. |
| 2011/0179799 A1 | 7/2011 | Allam et al. |
| 2011/0233940 A1 | 9/2011 | Aoyama et al. |
| 2011/0239651 A1 | 10/2011 | Aoyama et al. |
| 2012/0067054 A1 | 3/2012 | Palmer et al. |
| 2012/0131925 A1 | 5/2012 | Mittricker et al. |
| 2012/0247105 A1 | 10/2012 | Nelson et al. |
| 2013/0118145 A1 | 5/2013 | Palmer et al. |
| 2013/0205746 A1 | 8/2013 | Allam et al. |
| 2013/0213049 A1 | 8/2013 | Allam et al. |
| 2016/0069262 A1 | 3/2016 | Allam et al. |
| 2017/0058712 A1 | 3/2017 | Allam et al. |

FOREIGN PATENT DOCUMENTS

| | | |
|---|---|---|
| JP | 2001-132472 | 5/2001 |
| JP | 2010-281272 | 12/2010 |
| WO | WO 95/12757 | 5/1995 |
| WO | WO-2006-025449 | 3/2006 |

OTHER PUBLICATIONS

Dostal et al., "A Supercritical Carbon Dioxide Cycle for Next Generation Nuclear Reactors," 2004, (Research Paper) *Advanced Nuclear Power Technology Program at MIT*, 326 pages.

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Convers. Mgmt*, 1997, Suppl. pp. S141-S146, vol. 38.

E.I. Yantovskii et al., "Computer Exergonomics of Power Plants Without Exhaust Gases," Energy Convers. Mgmt., Publ. 1992, vol. 33, No. 5-8, pp. 405-412.

Wall et al., "A Zero Emission Combustion Power Plant For Enhanced Oil Recovery," *Energy*, 1995, pp. 823-828, vol. 20, No. 8.

http://www.graz-cycle.tugraz.at/pdfs/Bolland_Kvamsdal_Boden_Liege.pdf; Bolland, "A Thermodynamic Comparison of the Oxy-Fuel Power Cycles Water-Cycle, Graz-Cycle and Matiant-Cycle," *Norwegian University of Science and Technology*, Trondheim, Norway. Presentation, paper published in the proceedings of the International Conference Power Generation and Sustainable Development, Liège (Belgium), Oct. 8-9, 2001.

http://www.2.ulg.ac.be/genienuc/pageco2.htm; Université de Liège, Department of Power Generation, "CO2 Researches" Web-page dated Sep. 1, 1998 (retrieved on Feb. 25, 2011).

LOW-GRADE HEAT OPTIMIZATION OF RECUPERATIVE SUPERCRITICAL $CO_2$ POWER CYCLES

CROSS-REFERENCE TO RELATED APPLICATIONS

The present application is a continuation of U.S. patent application Ser. No. 16/113,076, filed Aug. 27, 2018, which claims priority to U.S. Provisional Patent Application No. 62/551,025, filed Aug. 28, 2017, the disclosures of which are incorporated herein by reference in their entirety.

FIELD OF THE INVENTION

The present disclosure provides systems and methods for power production with combustion of a carbonaceous fuel as well as input of heat from a low-grade heat source, such as a solar heat source.

BACKGROUND

Carbon dioxide ($CO_2$) is a known product of the combustion of carbonaceous fuels, and power production systems utilizing combustion of carbonaceous fuels are required to capture produced $CO_2$. U.S. Pat. No. 8,596,075 to Allam et al., describes a power production system using a $CO_2$ working stream whereby $CO_2$ produced from combustion can be withdrawn for various end uses. U.S. Patent Pub. No. 2013/0118145 to Palmer et al. describes a power production system using a $CO_2$ working stream whereby a stream of heated, high pressure recycled $CO_2$ can be further heated with a solar heater. This appears to require that solar heating occurs within a supercritical $CO_2$ stream at pressures in excess of 150 bar (or even higher than 300 bar) and at temperatures above 500° C. Such temperature and pressure conditions, however, lead to significant challenges with respect to the design of a concentrated solar power (CSP) receiver if the supercritical $CO_2$ is to be heated directly. If the supercritical $CO_2$ is to be heated by an intermediate heat transfer loop, the challenge then becomes finding heat exchanger materials that can not only handle the high temperature and pressure of the supercritical $CO_2$, but also possibly undesirable effects from heater transfer fluids that may be used with CSP applications at high temperatures, such as temperatures in excess of abut 400° C. Accordingly, there remains a need in the art for additional systems and methods for power production with the ability to incorporate solar heating.

SUMMARY OF THE DISCLOSURE

The present disclosure relates to systems and methods whereby a variety of low-grade heat sources, such as solar energy, may be effectively integrated with a supercritical $CO_2$ power cycle such as, for example, by interfacing the low-grade heating directly with a recuperative heat exchanger train instead of utilizing terminal heat transfer (e.g., heating to the highest desired temperature in the cycle). As such, the present disclosure encompasses power production systems and methods whereby low-grade heating is integrated with a $CO_2$ power cycle, such as by directly interacting with a recuperator heat exchanger.

In some embodiments of the present disclosure, a turbine exhaust gas can be preheated before it enters the recuperative heat exchanger train and/or after it enters the recuperative heat exchanger train (i.e., part way through the recuperator heat exchanger). The low-pressure fluid in the $CO_2$ power cycle is directly heated while still providing high temperature heat recovery in the recycle $CO_2$ but without direct communication with the low-grade heat source, such as a concentrated solar power (CSP) system. This configuration can be advantageous since it reduces or eliminates any undesirable effects that may arise from the contact of an intermediate heat transfer fluid with a high-pressure $CO_2$ stream in a heat exchanger. As such, technology and commercial risks can be minimized.

The low-pressure $CO_2$ may also be heated through direct contact with a benign heat transfer fluid that can be managed in a manner such that the recycle $CO_2$ is not permanently contaminated. For example, a CSP system or other form of heat (e.g., flue gas from a gas turbine) may be used to generate steam (other working fluids could include $CO_2$, as well as compounds that form a vapor phase above approximately 100° C. and are a liquid at a temperature no cooler than ambient). This steam may then be merged with the turbine exhaust gas from the $CO_2$ power cycle before it enters the recuperative heat exchanger train and/or after it enters the recuperative heat exchanger train (i.e., part way through the recuperator heat exchanger). The steam may then be separated as liquid water in a dedicated water separation step at the exit of the recuperative heat exchanger train. It can then be pumped back to the heat source and converted into steam to start the process over again.

The advantages of the presently disclosed systems and methods focus on further optimizing the heat transfer performance of the main recuperative heat exchanger train in order to lift the recycle $CO_2$ temperature entering the combustor/heater. This is fundamentally different from known systems and methods utilizing solar heating by directly heating the recycle $CO_2$ stream itself.

In one or more embodiments, the present disclosure provides methods for power generation. In an example embodiment, the method can comprise: combusting a fuel in a combustor with an oxidant in the presence of a compressed stream of carbon dioxide to form a compressed combustion product stream; expanding the compressed combustion product stream across a turbine to generate power and provide an expanded combustion product stream; passing the expanded combustion product stream through a primary heat exchanger to recuperate an available quantity of heat therefrom and form a cooled turbine exhaust stream; removing water from the cooled turbine exhaust stream to provide a stream of carbon dioxide; compressing the stream of carbon dioxide to form the compressed stream of carbon dioxide; recycling the compressed stream of carbon dioxide back to the combustor; heating a circulating fluid stream in a low-grade heat source to form a heated circulating fluid stream; and using the heated circulating fluid stream to increase the available quantity of heat in the expanded combustion product stream. In further embodiments, the method may be characterized in relation to one or more of the following statements, which can be combined in any order or number.

The circulating fluid stream can be recycled back to the low-grade heat source to be reheated after using the heated circulating fluid stream to increase the available quantity of heat in the expanded combustion product stream.

The heat can be transferred from the heated circulating fluid stream downstream from the turbine and upstream from the primary heat exchanger.

The expanded turbine exhaust stream and the heated circulating fluid stream can be passed through a secondary heat exchanger.

The heated circulating fluid stream can be passed through the primary heat exchanger.

The heated circulating fluid stream can be mixed with the expanded turbine exhaust stream downstream from the turbine and upstream from the primary heat exchanger.

The heated circulating fluid stream can be mixed with the expanded turbine exhaust stream while the expanded turbine exhaust stream is passing through the primary heat exchanger.

At least a portion of the circulating fluid stream that is mixed with the expanded turbine exhaust stream can be separated from the expanded turbine exhaust stream after passage through the primary heat exchanger.

The expanded turbine exhaust stream mixed with the circulating fluid can be passed through a separation unit downstream from the primary heat exchanger.

The at least a portion of the circulating fluid stream that is separated from the expanded turbine exhaust stream after passage through the primary heat exchanger can be recycled back to the low-grade heat source to be reheated.

The circulating fluid stream can comprise water.

The circulating fluid stream can comprise carbon dioxide.

The circulating fluid stream can comprise a refrigerant.

The primary heat exchanger can comprise a plurality of heat exchange units.

A side heater can be positioned between a first heat exchange unit and a second heat exchange unit, the expanded turbine exhaust stream can pass through the side heater, and the heated circulating fluid stream can pass through the side heater to provide heat to the expanded turbine exhaust stream.

The heated circulating fluid stream can be mixed with the expanded turbine exhaust stream between two heat exchange units of the plurality of heat exchange units.

The low-grade heat source can be a solar heater.

In one or more embodiments, the present disclosure can provide systems for power generation. In an example embodiment, the system can comprise: a combustor configured to receive a fuel, an oxidant, and compressed stream of carbon dioxide; a turbine configured to expand a combustor exhaust stream received from the combustor; a primary heat exchanger configured to recuperate an available quantity of heat from an expanded turbine exhaust stream received from the turbine; a separator configured to remove water from the expanded turbine exhaust stream received from the primary heat exchanger; a compressor configured to compress a stream of carbon dioxide received form the separator; a line configured to pass compressed carbon dioxide from the compressor to the combustor via the primary heat exchanger; a low-grade heat source configured to provide a heated circulating fluid stream; and at least one combiner configured for combining heat from the heated circulating fluid stream with the expanded turbine exhaust stream. In further embodiments, the system can be characterized by one or more of the following statements, which can be combined in any order or number.

The at least one combiner can include a secondary heat exchanger positioned downstream from the turbine and upstream from the primary heat exchanger, the secondary heat exchanger being configured for exchanging heat between the heated circulating fluid stream and the expanded turbine exhaust stream.

The primary heat exchanger can comprise a plurality of heat exchange units.

The combiner can be positioned between two heat exchange units of the plurality of heat exchange units.

The low-grade heat source can be a solar heater.

DETAILED DESCRIPTION

Figure 1:
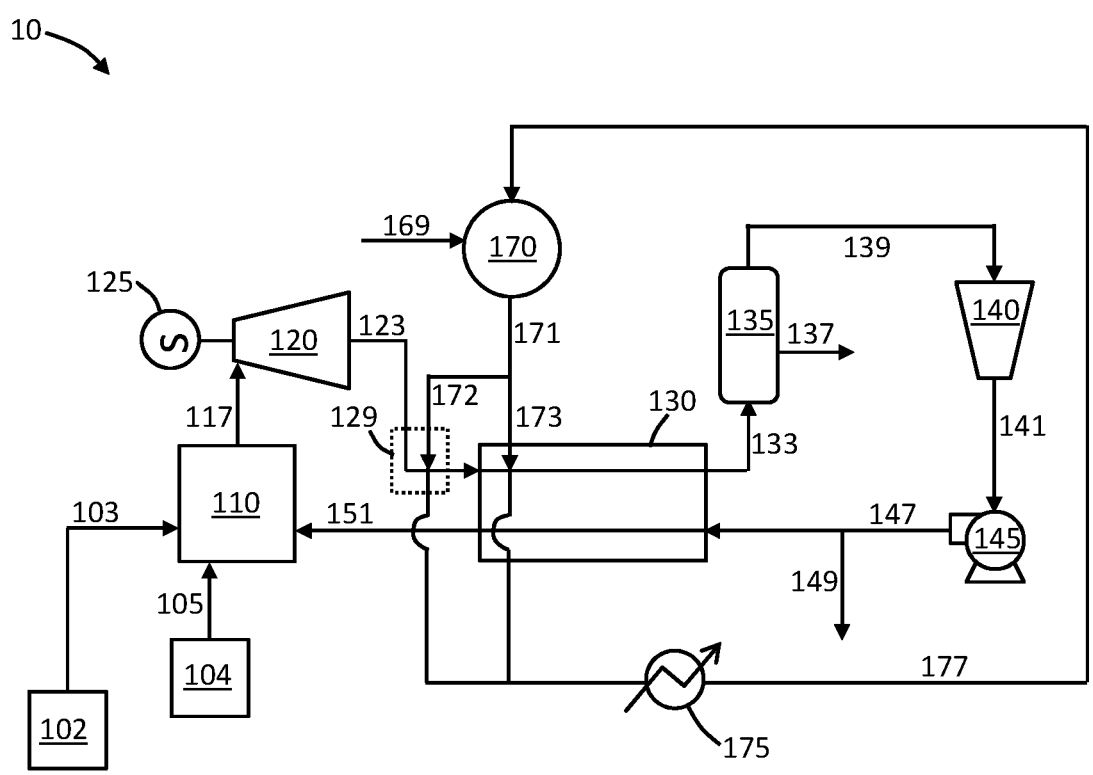
FIG. 1 is a flow diagram showing an example embodiment of a power generation cycle utilizing low-grade heating to heat a low pressure stream according to the present disclosure without commingling with the low pressure stream.

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to systems and methods for power production. The systems and methods can be exemplified in relation to various embodiments whereby solar heating is integrated with a power cycle wherein a high pressure, high temperature recycle $CO_2$ stream is further heated (e.g., in a combustor), expanded in a turbine for power production, cooled in a recuperator heat exchanger, re-pressurized, and re-heated in the recuperator heat exchanger. Non-limiting examples of systems and methods for power production, and elements thereof, that may be suitable for use according to the present disclosure are described in U.S. Pat. Nos. 8,596,075, 8,776,532, 8,959,887, 8,986,002, 9,068,743, 9,416,728, 9,546,814, 10,018,115, and U.S. Pub. No. 2012/0067054, the disclosures of which are incorporated herein by reference. Unlike previous systems and methods utilizing low-grade heating, the presently disclosed systems and methods do not require that a recycle $CO_2$ stream is superheated after already being heated in a recuperator heat exchanger train.

In one or more example embodiments, low-grade heat is provided directly to the recuperative heat exchanger train. As used herein, low-grade heat can mean heat in a range of about 100° C. to about 550° C., about 150° C. to about 500° C., or about 200° C. to about 450° C. This can essentially eliminate any need for heat integration from a further outside source, such as the heat of compression from an air separation unit (ASU), a hot gas compressor, and/or other sources. The low-grade heat, for example, can heat up the turbine exhaust mid recuperative heat exchanger train either directly or indirectly. The addition of heat permits the $C_P$ imbalance between the turbine exhaust and recycle $CO_2$ to be mitigated thereby increasing the recycle $CO_2$ temperature into the combustor.

In one or more embodiments, various types of additive heating can be combined. In such instances, the combined heating sources can particularly be added to different streams at different points in the cycle. For example, added heating can be provided from an ASU and/or a hot gas compressor to a recycle stream that is already compressed and ready for recycle back into a combustor (e.g., added to the recycle stream while the recycle stream is being heated in the heat exchanger or added at some point between the hot end of the heat exchanger and the combustor). In such cases, low-grade heat may also be added to the turbine exhaust stream so that it can be superheated before entering the recuperative heat exchanger train. A portion of the heat transfer fluid may also be cooled below the turbine exhaust temperature to provide even further low-grade heating, and this supplement the heating that is provided by the ASU and/or hot gas compressor or even reduce the amount of heating that must be provided from such sources. This supplemental heat provides the same $C_P$ benefit as noted above. It may also permit the flow through uncooled compressors (hot gas compressor to intercooled compressor ratio varied) used for low-grade heat generation to be reduced thereby minimizing internal parasitic load consumption and increasing net power generation. The low grade heat addition not only increases efficiency but also power export since it can reduce the need for internal heat generation that leads to higher net efficiency but reduced power output. Alternatively, the flow through uncooled low-grade heat generating compressors may not be reduced and the excess available heat in the recuperative heat exchanger train may be used to thermally supplement a third party industrial process such as in a combined heat and power system or to reduce the effective size of the main heat exchanger train. The addition of low-grade heating according to the present disclosure is particularly beneficial in that can increase the internal temperature approaches within the heat exchanger and reduce the relative size of the heat exchanger.

An exemplary power production system 10 for carrying out a power production method according to the present disclosure is illustrated in FIG. 1. As shown therein, a combustor 110 is configured for receiving an oxidant in line 103 from oxidant source 102 and for receiving a fuel in line 105 from fuel source 104. The fuel from line 105 is combusted in the combustor 110 with the oxidant from line 103 to form the combustor exhaust exiting the combustor in line 117. The combustor exhaust in line 117 is passed through a turbine 120 to generate power in generator 125, and the expanded combustor exhaust exits the turbine as turbine exhaust in line 123. The turbine 120 may be referenced as a first turbine or a primary turbine. The expanded turbine exhaust exiting the primary turbine 120 in line 123 is passed through a recuperator heat exchanger 130 to cool the turbine exhaust and provide heat to one or more further streams. The recuperator heat exchanger 130 may be referenced as a first heat exchanger or a primary heat exchanger. The cooled turbine exhaust exits the primary heat exchanger 130 in line 133 and passes to a water separator 135 for purification of the $CO_2$ in the turbine exhaust stream. Water and any entrained elements are withdrawn through line 137, and substantially pure $CO_2$ exits the water separator 135 in line 139. The substantially pure $CO_2$ in line 139 is first compressed in compressor 140 before passing through line 141 to a pump 145 to form the recycle $CO_2$ stream in line 147 at a pressure suitable for input back to the combustor 110. Although a compressor 140 and a pump 145 are illustrated, it is understood that one or a combination of elements may be used for compression of the recycle $CO_2$ stream. For example, an inter-cooled, multi-stage compressor may be utilized. A fraction of the recycle $CO_2$ in line 147 may be withdrawn from the system through $CO_2$ product line 149. Additionally, or alternatively, product $CO_2$ may be withdrawn at different pressures from line 139 and/or line 141. The recycle $CO_2$ in line 147 is heated by passage back through the primary heat exchanger 130 to exit as line 151 for recycle back into the combustor 110. In this manner, line 151 is configured to pass compressed carbon dioxide from the compressor 140 (particularly from the compressor and the pump 145) to the combustor 110 via the primary heat exchanger 130. If desired, a portion of the recycle $CO_2$ in line 151 and/or line 147 and/or line 141 may be withdrawn and added to line 103 for use as a diluent for the oxidant in line 103.

A low-grade heat source 170 is utilized to provide heating to a circulating stream. Any heat source capable of providing heating in the necessary temperature range may be utilized. In some embodiments a CSP heating unit may be utilized. In further examples, a gas turbine or other known heat source typically used in a power generation method may be used. Preferably, the low-grade heat source 170 is configured to provide a heated circulating fluid stream at a temperature in a range of about 100° C. to about 550° C., about 150° C. to about 500° C., or about 200° C. to about 450° C. The circulating fluid may be any material this is flowable under the required temperature conditions and that provides efficient heat transfer. In the exemplified embodiments, the circulating fluid stream for transfer of the low-grade heat need not necessarily be compatible with the turbine exhaust stream since the two streams are not intermixed.

As shown in FIG. 1, a circulating fluid is provided to the low-grade heat source 170 through line 169, and make-up fluid can be provided as needed during operation of the power production system 10. The circulating fluid is heated in the low-grade heat source 170 to the desired temperature and passes through line 171 to transfer the heat to the turbine exhaust stream in line 123. The system 10 includes at least one combiner that is configured for combining heat from the heated circulating fluid stream with the expanded turbine exhaust stream. The combiner can take on a variety of forms and can be any element suitable for transferring heat between streams and/or directly mixing streams. Non-limiting examples of elements that may be useful as a combiner herein include a heat exchanger, a side heater, a union, a valve, a mixing unit, and the like.

FIG. 1 illustrates alternative pathways for the circulating fluid in line 171. The circulating fluid may pass through line 172 in order to provide heating to the turbine exhaust in line 123 prior to passage into the primary heat exchanger 130. As illustrated by the dashed lines, an optional line heater 129 may be included to facilitate heat transfer from line 172 to line 123. The line heater 129 thus may be referred to as a secondary heat exchanger. The circulating fluid may alternatively pass through line 173 in order to provide heating to the turbine exhaust in line 123 during passage through the primary heat exchanger. Preferably, circulating fluid in line 173 is provided to a point in the primary heat exchanger 130 so that heat transfer is effected before the turbine exhaust has lost a significant portion of its heat. For example, the turbine exhaust temperature may be at 40%, at least 50%, at least 60%, at least 70%, at least 80%, or at least 90% of its original temperature (e.g., up to a maximum of 99.9%) at the point during passage through the primary heat exchanger 130 when heat is transferred from the circulating fluid in line 173. In certain embodiments, the circulating fluid in line 173 may transfer its heat to the turbine exhaust in line 123 while passage through the primary turbine exhaust 130 while the temperature of the turbine exhaust is in the range of about 150° C. to about 550° C., about 200° C. to about 500° C., about 250° C. to about 475° C., or about 300° C. to about 450° C. The circulating fluid in line 171 may pass solely through line 172, may pass solely through line 173, or may be split for passage between line 172 and line 173. In the case of the latter configuration, a splitter (not illustrated) may be included to control the ratio of the circulating fluid that is split between line 172 and line 173. It is thus possible to transfer heat from the heated circulating fluid stream downstream from the turbine and upstream from the primary heat exchanger. Alternatively, it is possible to transfer heat from the heated circulating fluid stream at a point in the cycle that is upstream from the cold end of the primary heat exchanger.

The heated circulating fluid stream from the low-grade heat source 170 can be used to increase the available quantity of heat in the expanded combustion product stream. The available quantity of heat in the expanded combustion product stream is utilized to heat the compressed carbon dioxide stream that is passed back to the combustor, and it is desirable to recuperate heat from the expanded turbine exhaust stream to provide such heating. There are definite limits, however, on the amount of heat that can be recuperated in this manner. By adding heat from the heated circulating fluid stream to the expanded turbine exhaust stream, it is possible to increase the available quantity of heat that can be withdrawn in the primary heat exchanger 130 to heat the compressed carbon dioxide stream. Preferably, the addition of the heat from the heated circulating fluid stream leaving the low-grade heat source is sufficient to increase the available quantity of heat from the expanded turbine exhaust stream by at least 5%, at least 10%, or at least 20%. For example, the addition of the heat from the heated circulating fluid stream can be sufficient to increase the available quantity of heat from the expanded turbine exhaust stream by at least 3° C., at least 5° C., at least 10° C., at least 20° C., at least 50° C., or at least 100° C. (up to a maximum or 300° C.). More particularly, the addition of the heat from the heated circulating fluid stream can be sufficient to increase the available quantity of heat from the expanded turbine exhaust stream by about 10° C. to about 300° C., about 20° C. to about 200° C., or about 25° C. to about 100° C. The increase in the available quantity of heat can be calculated by measuring the temperature of the compressed carbon dioxide stream exiting the hot end of the primary heat exchanger 130 with addition of the heat from the heated circulating fluid stream to the expanded turbine exhaust stream and without addition of the heat from the heated circulating fluid stream to the expanded turbine exhaust stream while keeping the temperature of the expanded turbine exhaust stream exiting the turbine substantially constant. In some embodiments, such as when the heated circulating fluid is intermixed with the turbine exhaust stream, there is provided a beneficial increase in the total heating mass flow that is at the original turbine exhaust temperature. Thus, in example embodiments, the mass flow of heated fluid passing through the primary heat exchanger toward the cold end thereof can be increased by at least 5%, at least 10%, at least 15%, at least 20%, at least 30%, at least 40%, at least 50%, at least 75%, or at least 90% relative to the mass of the exhaust stream immediately exiting the turbine (e.g., with a maximum mass increase of 200%). In certain embodiments, the mass flow of heated fluid passing through the primary heat exchanger toward the cold end thereof can be increased by about 5% to about 200%, about 10% to about 150%, about 20% to about 100%, or about 25% to about 90%.

After transfer of heat to the turbine exhaust stream, the circulating fluid passes for re-heating in line 177. An optional cooler 175 may be provided in line 177 to reduce the temperature thereof and optionally to withdraw further available heat for use in the power production system 10. The circulating fluid then passes through line 177 back through the low-grade heat source to be re-heated to the desired temperature.

In one or more embodiments, the circulating fluid may be a material that is configured to form a vapor phase above a temperature of approximately 100° C. and is configured for converting to a liquid at a lower temperature (e.g., liquid at approximately ambient temperature, such as in a range of about 15° C. to about 90° C., about 18° C. to about 80° C., or about 20° C. to about 70° C.). In some embodiments, water may be used as the circulating fluid. In other embodiments, carbon dioxide may be used as the circulating fluid. In further embodiments, a mixture of water and carbon dioxide may be utilized as the circulating fluid. In still other embodiments, known refrigerants may be utilized as the circulating fluid.

Figure 2:
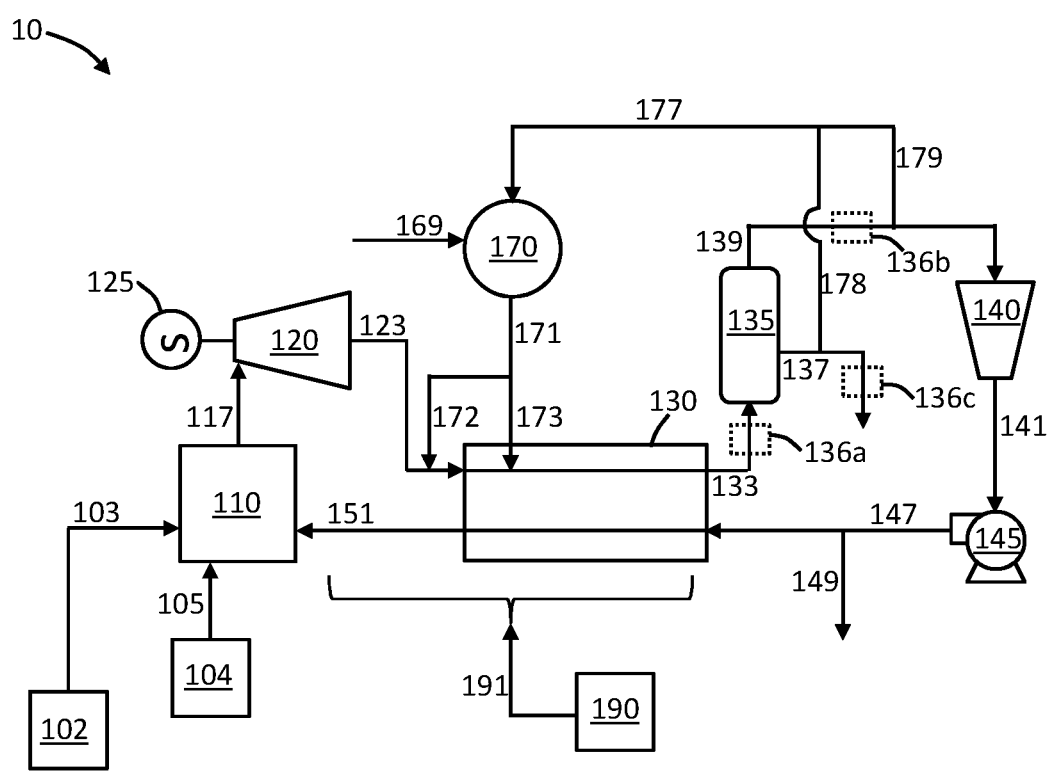
FIG. 2 is a flow diagram showing an example embodiment of a power generation cycle utilizing low-grade heating to heat a low pressure stream according to the present disclosure by combining a heating stream with the low pressure stream and removing the heating stream thereafter.

FIG. 2 illustrates a power production system substantially similar to the system shown in FIG. 1 but being configured for intermixture of the circulating fluid with the turbine exhaust stream to effect heating thereof. As illustrated in FIG. 2, a circulating fluid is provided to the low-grade heat source 170 through line 169, and make-up fluid can be provided as needed during operation of the power production system 10. The circulating fluid is heated in the low-grade heat source 170 to the desired temperature and passes through line 171 to transfer the heat to the turbine exhaust stream in line 123. FIG. 2 again illustrates alternative pathways for the circulating fluid in line 171. The circulating fluid may pass through line 172 in order to provide heating to the turbine exhaust in line 123 prior to passage into the primary heat exchanger 130. The circulating fluid may pass through line 173 in order to provide heating to the turbine exhaust in line 123 during passage through the primary heat exchanger 130. In either case, the circulating fluid may be combined with the turbine exhaust to form a mixed stream. As such, the stream exiting the primary heat exchanger in line 133 comprises the turbine exhaust combined with the circulating fluid. The combined stream can be processed in the water separator 135 to remove water from the turbine exhaust, the water exiting in line 137. In embodiments wherein water is used as the circulating fluid, a fraction of the water from line 137 can be diverted in line 178 to line 177 for passage back to the low-grade heat source 170. If desired, a splitter, valve, or similar element (not illustrated in FIG. 2) can be provided in line 137 to facilitate removal of the proper ratio of the water in line 137. In embodiments wherein the circulating fluid comprises carbon dioxide, the carbon dioxide can be removed from line 139 exiting the top of the water separator 135. Specifically, a fraction of the carbon dioxide from line 139 can be diverted in line 179 to line 177 for passage back to the low-grade heat source 170. Again, a splitter, valve, or similar element (not illustrated in FIG. 2) can be provided in line 139 to facilitate removal of the proper ratio of the carbon dioxide in line 139. In one or more embodiments, one or more additional separation units may be included in order to facilitate separation of the circulating fluid for recycling back to the low-grade heat source. For example, a first fluid separation unit 136a may be positioned in line 133 for removal of the circulating fluid from the turbine exhaust stream between the primary heat exchanger and the water separator 135. As another example, a second fluid separation unit 136b may be positioned in line 139 for removal of the circulating fluid from the recycle $CO_2$ stream between the water separator 135 and the compressor 140. As still another example, a third fluid separation unit 136c may be positioned in line 137 for removal of the circulating fluid from the water stream exiting the water separator 135. In each case, a further line may be provided for passage of the removed circulating fluid back to line 177 for passage into the low-grade heat source 170.

Figure 3A:
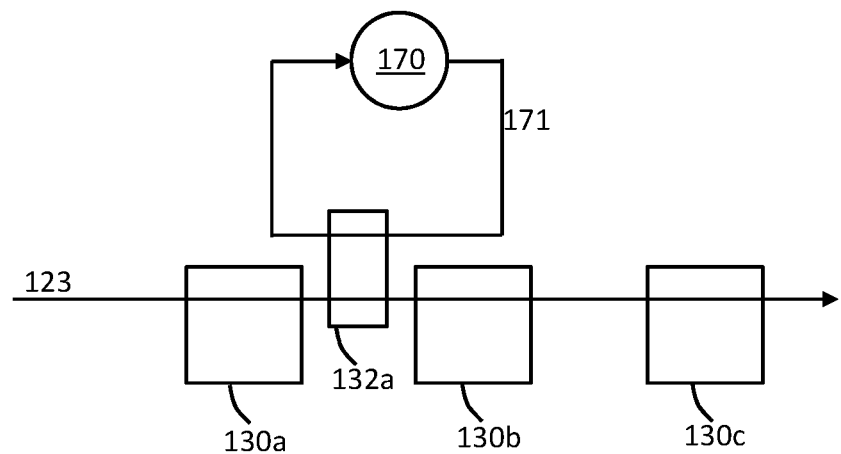
FIG. 3A through FIG. 3D provides flow diagrams for example embodiments of a portion of a power generation cycle illustrating the addition of heat to a turbine exhaust stream relative to passage through a plurality of heat exchange units.

In addition to the low-grade heating, even further heating can be provided in the present systems and methods. While the low-grade heating is particularly beneficial in providing added heating to the turbine exhaust stream prior to compression, it can still be useful to provide added heating to the compressed, recycle $CO_2$ stream. Referring to FIG. 2, an added heat source 190 can be provided, and heat can be provided via line 191, which may be a stream of a heating fluid that can be used to transfer heat to the compressed, recycle $CO_2$ stream. The heat from the added heat source 190 can be added at any point to the stream in line 151. As such, the heat from the added heat source can be added to the recycle $CO_2$ stream while it is being heated in the primary heat exchanger 130 or after passage through the primary heat exchanger and prior to passage into the combustor 110. If desired, a supplemental heat exchanger can be used for heat exchange between a stream in line 191 and the compressed, recycle $CO_2$ stream in line 151. Likewise, a side heater may be utilized in a manner similar to that described in relation to FIG. 3A and FIG. 3B. The added heat source 190 may be, for example, an ASU, a steam stream from a boiler, a stream from a hot gas compressor, or the like.

In one or more embodiments, the primary heat exchanger 130 may be formed of a plurality of heat exchange units. The heat from the low-grade heat source 170 then can be added to the turbine exhaust in line 123 at a variety of points and in a variety of manners. In the example embodiment of FIG. 3A (showing only a portion of the power production system that is otherwise illustrated in FIG. 1 and FIG. 2), the turbine exhaust stream passes through a first heat exchange unit 130a, a second heat exchange unit 130b, and a third heat exchange unit 130c. Although three heat exchange units are illustrated, it is understood that two heat exchange units may be used, or more than three heat exchange units may be utilized. As illustrated, the first heat exchange unit 130a is a high temperature unit, the second heat exchange unit 130b is an intermediate temperature unit, and the third heat exchange unit 130c is a low temperature unit. The turbine exhaust stream in line 123 passes sequentially through the heat exchange units. After passage through the first heat exchange unit, the turbine exhaust stream passes through a first side heater 132a where it is heated against the circulating fluid stream in line 171 that is passed countercurrent through the first side heater. In this manner, the turbine exhaust stream is heated at the temperature range between the first heat exchange unit 130a and the second heat exchange unit 130b.

Figure 3B:
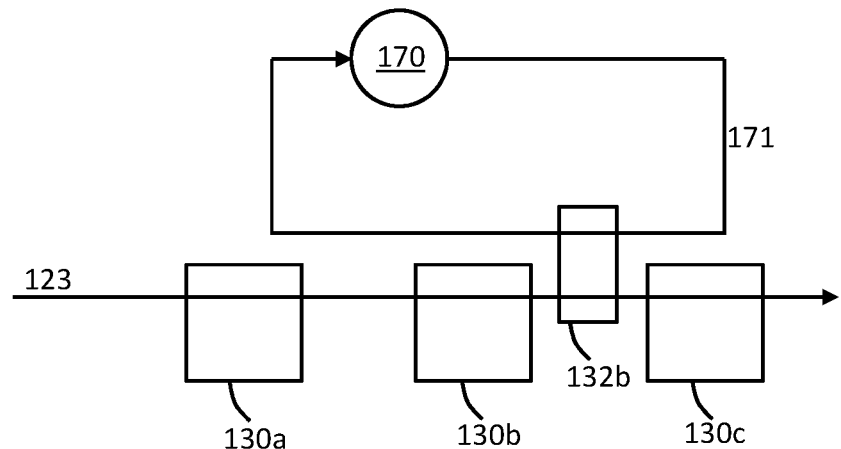

In a further example embodiment, as illustrated in FIG. 3B, the turbine exhaust stream in line 123 passes through a second side heater 132b after passage through the second heat exchange unit 130b and before passage through the third heat exchange unit 130c. Again, the turbine exhaust stream is heated against the circulating fluid stream in line 171 that is passed countercurrent through the second side heater 132b. In this manner, the turbine exhaust stream is heated at the temperature range between the second heat exchange unit 130b and the third heat exchange unit 130c. In some embodiments, both of the first side heater 132a and the second side heater 132b may be present, and the circulating fluid in line 171 may be split so that a first fraction of the heated circulating fluid exiting the low-grade heat source 170 is passed through the first side heater 132a, and a second fraction of the heated circulating fluid exiting the low-grade heat source is passed through the second side heater 132b. The ratio between the first fraction and the second fraction can be adjusted as needed. For example, the first fraction and the second fraction can be in a weight ratio of about 4:1 to about 1:4, about 2:1 to about 1:2, or about 1:1. Although not illustrated, the present disclosure also encompasses embodiments wherein a side heater is positioned upstream from the first heat exchange unit 130a in order to heat the turbine exhaust stream in line 123 prior to passage into the first heat exchange unit.

Figure 3C:
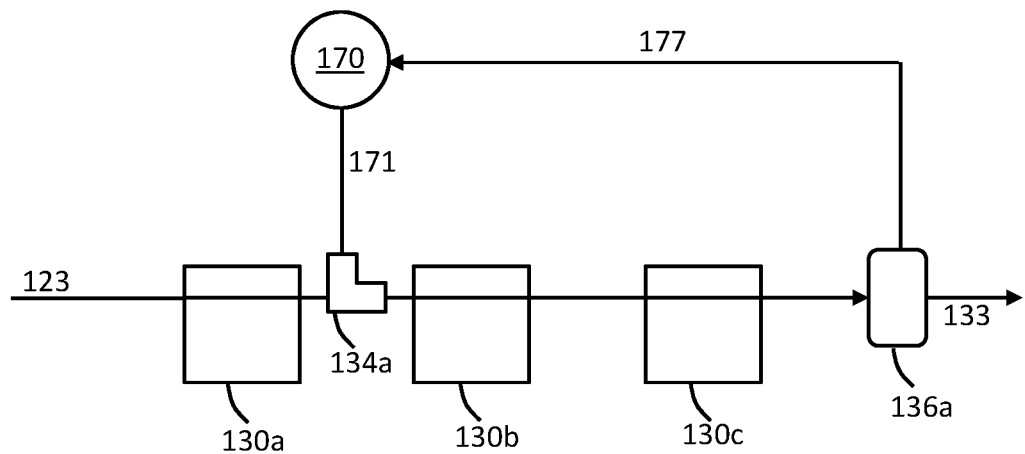

Similar to the foregoing, a plurality of heat exchange units may be utilized in embodiments wherein the circulating fluid is mixed with the turbine exhaust stream. As illustrated in FIG. 3C, the turbine exhaust stream in line 123 passes sequentially through the first heat exchange unit 130a, the second heat exchange unit 130b, and the third heat exchange unit 130c. A first union 134a is positioned between the first heat exchange unit 130a and the second heat exchange unit 130b. The heat circulating fluid stream in line 171 merges with the turbine exhaust stream in the first union 134a to form a mixed stream. The mixed stream then passes through the second heat exchange unit 130b and the third heat exchange unit 130c before passing to a first fluid separation unit 136a. The circulating fluid is separated and exits in line 177 for passage back to the low-grade heater for re-heating, and the turbine exhaust stream exits in line 133 for further processing as otherwise described herein. In this manner, the turbine exhaust stream is heated at the temperature range between the first heat exchange unit 130a and the second heat exchange unit 130b.

Figure 3D:
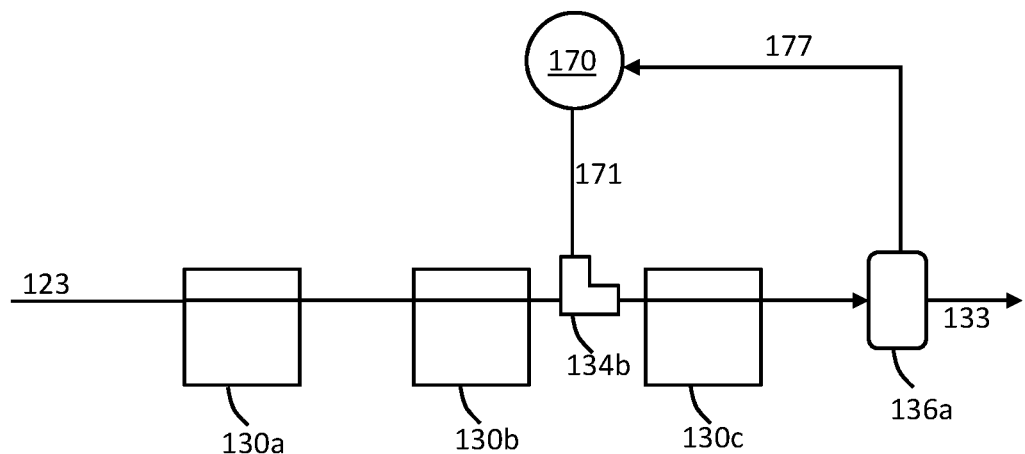

A further example embodiment is shown in FIG. 3d, wherein a second union 134b is positioned between the second heat exchange unit 130b and the third heat exchange unit 130c. The heat circulating fluid stream in line 171 merges with the turbine exhaust stream in the second union 134b to form a mixed stream. The mixed stream then passes through the third heat exchange unit 130c before passing to a first fluid separation unit 136a. The circulating fluid is separated and exits in line 177 for passage back to the low-grade heater for re-heating, and the turbine exhaust stream exits in line 133 for further processing as otherwise described herein. In this manner, the turbine exhaust stream is heated at the temperature range between the second heat exchange unit 130b and the third heat exchange unit 130c. In some embodiments, both of the first union 134a and the second union 134b may be present, and the circulating fluid in line 171 may be split so that a first fraction of the heated circulating fluid exiting the low-grade heat source 170 is passed to the first union, and a second fraction of the heated circulating fluid exiting the low-grade heat source is passed to the second union. The ratio between the first fraction and the second fraction can be adjusted as needed and can be in a range as described above. Although not illustrated, the present disclosure also encompasses embodiments wherein a union is positioned upstream from the first heat exchange unit 130a in order to heat the turbine exhaust stream in line 123 prior to passage into the first heat exchange unit.

The foregoing systems and methods are particularly beneficial for integration of low-grade heat sources (such as solar heating systems) with systems and methods utilizing a $CO_2$ working stream. It is understood, however, that such systems and methods may be used for any working fluid with disparities in $C_P$ values between high and low pressure.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for power generation, the method comprising:
combusting a fuel in a combustor with an oxidant in the presence of a compressed stream of carbon dioxide to form a compressed combustion product stream;
expanding the compressed combustion product stream across a turbine to generate power and provide an expanded combustion product stream;
passing the expanded combustion product stream through a primary heat exchanger to recuperate an available quantity of heat therefrom and form a cooled turbine exhaust stream;
removing water from the cooled turbine exhaust stream to provide a stream of carbon dioxide;
compressing the stream of carbon dioxide to form the compressed stream of carbon dioxide;
recycling the compressed stream of carbon dioxide back to the combustor;
heating a circulating fluid stream in a low-grade heat source to form a heated circulating fluid stream; and
using the heated circulating fluid stream to increase the available quantity of heat that is recuperated through heat exchange in one or both of the primary heat exchanger and a secondary heat exchanger, without intermixing of the heated circulating fluid stream and the expanded combustion product stream.

2. The method of claim 1, wherein the circulating fluid stream is recycled back to the low-grade heat source to be reheated after using the heated circulating fluid stream to increase the available quantity of heat that is recuperated.

3. The method of claim 1, wherein the heated circulating fluid stream is used to increase the available quantity of heat that is recuperated in the secondary heat exchanger downstream from the turbine and upstream from the primary heat exchanger.

4. The method of claim 1, wherein the heated circulating fluid stream is used to increase the available quantity of heat that is recuperated in the primary heat exchanger.

5. The method of claim 4, wherein heat from the heated circulating fluid stream is recuperated at a point in the primary heat exchanger where the expanded combustion product stream is at a temperature that is at least 40% of the temperature of the expanded combustion product stream when leaving the turbine.

6. The method of claim 4, wherein heat is transferred to the expanded combustion product stream from the heated circulating fluid stream at a point in the primary heat exchanger where the expanded combustion product stream is at a temperature in the range of 150° C. to 550° C.

7. The method of claim 1, wherein the circulating fluid stream comprises water.

8. The method of claim 1, wherein the circulating fluid stream comprises carbon dioxide.

9. The method of claim 1, wherein the primary heat exchanger comprises a plurality of heat exchange units.

10. The method of claim 9, wherein a side heater is positioned between a first heat exchange unit of the plurality of heat exchange units and a second heat exchange unit of the plurality of heat exchange units, the expanded turbine exhaust stream passes through the side heater, and the heated circulating fluid stream passes through the side heater to provide heat that is recuperated.

11. The method of claim 1, wherein the low-grade heat source is a solar heater.

12. The method of claim 1, wherein the low-grade heat source is effective to provide the heated circulating fluid stream in a temperature range of 100° to 500° C.

13. The method of claim 1, further comprising splitting the heated circulating fluid stream and passing portions of the heated circulating fluid stream separately to the primary heat exchanger and the second heat exchanger to increase the available quantity of heat that is recuperated.

* * * * *